United States Patent

Soreghy

[15] 3,643,756
[45] Feb. 22, 1972

[54] SAFETY CIRCUIT CONTROL DEVICE

[72] Inventor: Ivan L. Soreghy, Swanton, Ohio
[73] Assignee: Libbey-Owens-Ford Company, Toledo, Ohio
[22] Filed: Dec. 16, 1969
[21] Appl. No.: 885,411

[52] U.S. Cl. .............................. 180/103, 180/96, 340/273
[51] Int. Cl. ............................................... B60l 3/04
[58] Field of Search ............... 180/103, 82, 96; 340/273; 252/514

[56] References Cited

UNITED STATES PATENTS

| | | | |
|---|---|---|---|
| 3,441,925 | 4/1969 | White | 340/273 X |
| 1,418,678 | 6/1922 | Schauman | 180/96 |
| 3,207,706 | 9/1965 | Hoffman | 252/514 |
| 2,511,959 | 6/1950 | Williams | 180/96 |
| 3,208,070 | 9/1965 | Boicey | 296/84 X |
| 2,197,601 | 4/1940 | Wolauar | 296/84 X |
| 3,374,110 | 3/1968 | Miller | 252/514 X |
| 2,534,576 | 12/1950 | Continenza | 340/273 X |
| 1,223,583 | 4/1917 | Hitchcock | 340/273 |
| 535,100 | 3/1895 | Gill | 340/273 |

Primary Examiner—Leo Friaglia
Assistant Examiner—John P. Silverstrim
Attorney—Collins & Oberlin

[57] ABSTRACT

This application discloses an automatic safety switch in the form of a strip of silver-frit fired onto a margin of one of the glass sheets in the windshield of an automobile and interposed in the ignition circuit so that breaking of the windshield will cut off all electrical systems, thus stopping the engine and eliminating possible fire, shock and similar hazards.

5 Claims, 3 Drawing Figures

PATENTED FEB 22 1972

3,643,756

INVENTOR.
Ivan L. Soreghy
BY Collins & Oberlin
ATTORNEYS

SAFETY CIRCUIT CONTROL DEVICE

This invention relates broadly to automatically operable safety devices and more particularly to means for automatically stopping an automobile engine in the event of serious damage to the automobile.

The primary object of this invention is to provide a novel safety circuit control device which will automatically disconnect the electric systems of and prevent continuance of damage to an automobile involved in conditions of collision or other impacting forces.

Another object of the invention is to provide a control device of the above character that forms a portion of an automobile's electric system and is so incorporated into its windshield as to function whenever the windshield is broken.

A further object of the invention is to provide a control device of the above character that is embodied in a body of electrically conductive frangible material located in the structure of a laminated glass windshield and adapted to disconnect the electric system of an automobile involved in damage thereto.

Still another object is to provide a bypass circuit with the control device of the invention that will allow reconnection of the ignition system to permit the automobile to be subsequently driven with the broken windshield if desired.

Other objects and advantages will become apparent during the course of the following description, when read in connection with the accompanying drawings, wherein like numerals are employed to designate like parts throughout.

Figure 1:
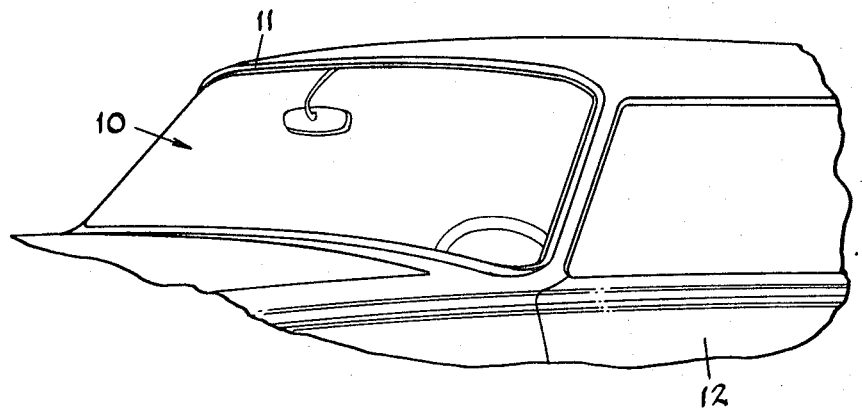
FIG. 1 is a fragmentary, perspective view of the front end of a conventional automobile equipped with the safety switch of the invention.

It is well known that the continued operation of an automobile engine after the vehicle has sustained extensive damage is often the cause of further damage and even total destruction. This usually is the result of collision with another moving or stationary vehicle or impact with a fixed object that may have rendered the occupants incapable of preventing further damage to themselves or the vehicle. It has also been recognized that if the electric circuit through the ignition switch could be disconnected, the risk of further damage, including fire, could be greatly reduced if not eliminated.

According to this invention the electric circuit from the power source and through the ignition switch is made to include a frangible element adapted to disconnect the circuit upon braking the windshield, which is probably the most common occurrence in serious accidents.

With reference now to the drawings, a windshield 10 of laminated safety glass is shown as being mounted in its functional position in the window opening 11 of an automobile 12. The structure of the windshield 10 includes layers or sheets of glass 14 and 15 that are composited with and bonded to a sheet of plastic 16 to provide a transparent glazing panel.

Figure 3:
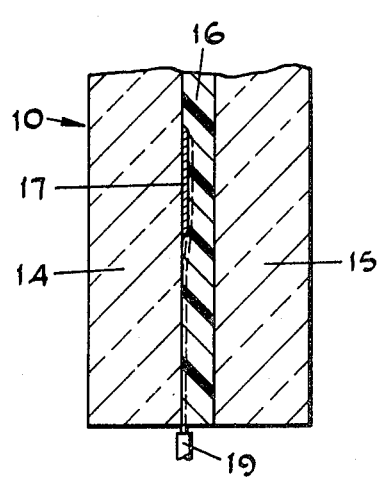
FIG. 3 is a vertical sectional view, on an enlarged scale, taken substantially along the line 3—3 of FIG. 2.
Figure 2:
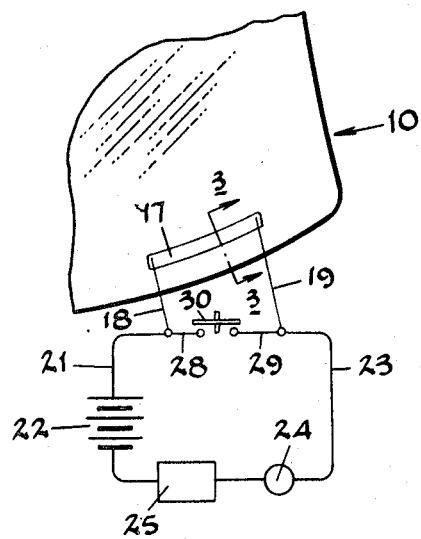
FIG. 2 is an enlarged diagrammatic view showing the lower right-hand corner of the windshield of FIG. 1 and the circuit control device associated therewith.

As viewed in FIGS. 2 and 3 there is provided an automatic safety switch in the form of a layer on strip 17 of electrically conducting material of relatively low resistance and that has been physically adhered to the inner surface of one of the glass sheets. For its intended purpose the layer 17 may be made up of a pastelike material which is a mixture of finely divided metal and glass frit with a bonding agent and can be applied with a printing wheel, brush or like tool, or by a silk-screen procedure, on the inner surface of either the "inboard" or "outboard" glass sheet of the windshield. An example of a metal-frit paste that has been successfully used in one containing 35 to 75 percent silver, 10 to 50 percent glass frit and 15 percent organic binder and solvent.

A glass sheet with this type of metal-frit paste applied can then be matched with a second glass sheet and the two sheets heated and bent as a pair in the manner common in producing bent laminated safety glass for windshields. During the heating phase of the bending operation, the silver paste material will become fired-onto and tightly adhered to the glass surface.

A printed, silver-frit layer of this character is especially suited for the purpose because brittleness is an inherent characteristic of thin layers, such as the strip 17, of these metal-frit mixtures. This is because the glass frit that is mixed with the silver in the paste as it is applied provides an adhering interlayer between the conducting silver and the glass surface and, since the frit itself is glass, when the windshield breaks the frit layer also has to break. Moreover, a windshield breaks in all directions upon impact, so that an accident severe enough to result in cracking or shattering of the windshield 10 will immediately and automatically break any electrical circuit through the layer 17.

The location and area of the strip or layer 17 as shown in FIGS. 2 and 3 are preferred. Thus, by placing it in a lower margin of the windshield it is concealed from view by the windshield frame 11 and by locating it on an inboard light of a laminated glass structure it will be protected from accidental injury and the possibilities of electrical shock are minimized. Nevertheless it will be appreciated that the device can be employed with glazing panels other than windshields, with tempered as well as with annealed glass, with single as well as with multiple sheet structures of glass and plastic and that it can be employed in any desired area of the panel and on any surface of any sheet or layer of the panel structure.

Similarly, while the area of the strip 17, as shown in FIG. 2, is adequate for the purpose and the load it adds to the electrical circuit of the automobile is negligible, it may be varied considerably without adverse effect.

To interpose such a strip or automatic switch 17 in the ignition circuit, wires such as shown at 18 and 19 may be physically connected to the conductive material of the strip at its opposite ends. As illustrated in FIG. 2, the wire 18 is extended outwardly from the edge of the windshield and connected into the electrical system of an automobile by way of wire 21 from one side of the storage battery 22 while the wire 19 connects by way of wire 23 through the ignition switch 24 and engine 25 to the opposite side of said battery.

With this arrangement, in the event of physical damage to the windshield, the conductive capacity of the layer 17 will be interrupted thereby opening the circuit through wires 18–21 and 19–23 with a resultant shutting off of the ignition and stopping operation of the motor.

This will prevent further damage to the automobile and injury to the occupants after the initial impact. However, should it subsequently be found desirable to reactivate the automobile, a shunt control circuit is provided to permit resumed operation of the engine 25, so that, even with the damaged windshield, the automobile can be driven from the scene of the accident.

To this end wires 21 and 23 may be extended past wires 18 and 19 as at 28 and 29 and connected to opposite sides of a normally open manual control switch 30 whereby closing of the switch 30 will bypass the strip 17 by way of wires 21–28 and 23–29 and thus reestablish current flow through the ignition switch 24.

I claim:

1. The combination with an automotive vehicle including a source of electrical power, an ignition circuit connected to said source, and a transparent glazing panel; of an automatic safety switch interposed in said circuit and comprising a frangible and readily separable strip of conducting material on and covering only a minor area of a surface of said panel.

2. Apparatus as defined in claim 1 in which said glazing panel is a laminated windshield including glass and plastic layers bonded together in face to face relation, and said strip is located between said bonded layers.

3. Apparatus as defined in claim 1 in which said strip comprises a layer of finely divided metal adhered to said surface.

4. Apparatus as defined in claim 3 in which said panel includes a sheet of glass, and said strip comprises a layer of metal-frit fired onto a surface of said sheet.

5. Apparatus as defined in claim 1 in which said strip is positioned adjacent an edge of said panel, and said bypassing means includes a manually operable switch.

* * * * *

PO-1050
(5/69)

UNITED STATES PATENT OFFICE
CERTIFICATE OF CORRECTION

Patent No. 3,643,756      Dated February 22, 1972

Inventor(s)    Ivan L. Soreghy

It is certified that error appears in the above-identified patent and that said Letters Patent are hereby corrected as shown below:

Col. 1, line 52, cancel "braking" and insert --breaking--
Col. 1, line 61, cancel "on" and insert --or--
Col. 1, line 70, cancel "in" and insert --is--
Col. 2, line 66 (Claim 1), after "panel" insert --and means for by-passing said safety switch to optionally re-establish said ignition circuit when broken by fracture of said frangible strip--

Signed and sealed this 4th day of July 1972.

(SEAL)
Attest:

EDWARD M. FLETCHER, JR.
Attesting Officer

ROBERT GOTTSCHALK
Commissioner of Patents